US010624382B2

(12) United States Patent
Wenger et al.

(10) Patent No.: US 10,624,382 B2
(45) Date of Patent: Apr. 21, 2020

(54) HIGH SPECIFIC MECHANICAL ENERGY EXTRUSION SCREW ASSEMBLY

(71) Applicant: Wenger Manufacturing Inc., Sabetha, KS (US)

(72) Inventors: Marc L. Wenger, Sabetha, KS (US); Philip B. Wiltz, Sabetha, KS (US)

(73) Assignee: Wenger Manufacturing Inc., Sabetha, KS (US)

( * ) Notice: Subject to any disclaimer, the term of this patent is extended or adjusted under 35 U.S.C. 154(b) by 100 days.

(21) Appl. No.: 15/981,557

(22) Filed: May 16, 2018

(65) Prior Publication Data

US 2018/0343914 A1    Dec. 6, 2018

Related U.S. Application Data

(60) Provisional application No. 62/513,899, filed on Jun. 1, 2017.

(51) Int. Cl.

| A23N 17/00 | (2006.01) |
| B01F 7/00 | (2006.01) |
| A23P 30/20 | (2016.01) |
| B29C 48/60 | (2019.01) |
| B29C 48/535 | (2019.01) |
| B29C 48/57 | (2019.01) |
| B29C 48/615 | (2019.01) |

(52) U.S. Cl.
CPC ............ *A23N 17/005* (2013.01); *A23P 30/20* (2016.08); *B01F 7/00416* (2013.01); *B29C 48/60* (2019.02); *B01F 2215/0024* (2013.01); *B29C 48/535* (2019.02); *B29C 48/57* (2019.02); *B29C 48/615* (2019.02)

(58) Field of Classification Search
CPC ................... A23N 17/005; A23P 30/20; B01F 2215/0024; B01F 7/00416; B29C 48/60; B29C 48/615; B29C 48/57; B29C 48/535
USPC .......................................................... 366/88
See application file for complete search history.

(56) References Cited

U.S. PATENT DOCUMENTS

| 1,677,119 A | 7/1928 | Kinyon |
| 2,115,006 A | 4/1938 | Burghauser |

(Continued)

FOREIGN PATENT DOCUMENTS

| CN | 204222133 U | 3/2015 |
| DE | 1504449 A1 | 10/1969 |

(Continued)

OTHER PUBLICATIONS

International Search Report and Written Opinion dated Jan. 17, 2019, in PCT/US2018/033001 filed May 16, 2018.

(Continued)

*Primary Examiner* — Tony G Soohoo
(74) *Attorney, Agent, or Firm* — Hovey Williams LLP

(57) ABSTRACT

High Specific Mechanical Energy extruder screw assemblies (14, 88, 98) and complete extruders (10, 86, 96) are provided, which include wide-flight intermediate screw sections (104) having axial flight widths greater than the flight widths of the inlet and outlet screw sections (102, 106) on opposite sides of the intermediate sections (104). The intermediate sections (104) provide increased friction and shear serving to enhance the SMEs imparted to comestible food materials during processing thereof.

25 Claims, 4 Drawing Sheets

(56) References Cited

U.S. PATENT DOCUMENTS

| | | | | |
|---|---|---|---|---|
| 2,136,264 | A | * | 11/1938 | Kiesskalt .............. B01F 7/082 366/85 |
| 2,231,357 | A | | 2/1941 | Burghauser et al. |
| 2,508,495 | A | * | 5/1950 | Consalvo .............. B30B 11/243 366/85 |
| 2,686,336 | A | * | 8/1954 | Bernhardt .............. B29B 7/484 366/85 |
| 3,104,420 | A | | 9/1963 | Selbach |
| 3,577,494 | A | | 5/1971 | Chisholm et al. |
| 3,698,541 | A | * | 10/1972 | Barr .............. B29C 48/505 366/343 |
| 4,184,772 | A | * | 1/1980 | Meyer .............. B29B 7/425 366/77 |
| 4,277,182 | A | * | 7/1981 | Kruder .............. B29C 48/65 366/89 |
| 4,405,239 | A | | 9/1983 | Chung et al. |
| 4,818,206 | A | | 4/1989 | Maillefer |
| 5,728,337 | A | | 3/1998 | Yoshikawa et al. |
| 6,599,004 | B2 | * | 7/2003 | Barr .............. B29C 48/505 366/88 |
| 6,672,753 | B1 | | 1/2004 | Womer et al. |
| 7,476,096 | B2 | | 1/2009 | Iwata et al. |
| 7,521,076 | B1 | * | 4/2009 | Wenger .............. A23N 17/005 426/510 |
| 8,393,780 | B2 | * | 3/2013 | Wenger .............. A23N 17/005 366/85 |
| 8,827,539 | B2 | * | 9/2014 | Wenger .............. A23N 17/005 366/85 |
| 8,985,034 | B2 | | 3/2015 | Dummett |
| 2004/0043094 | A1 | | 3/2004 | Hauck et al. |
| 2008/0223223 | A1 | | 9/2008 | Wenger et al. |
| 2009/0016147 | A1 | | 1/2009 | Behling et al. |
| 2018/0343914 | A1 | * | 12/2018 | Wenger .............. B01F 7/00416 |

FOREIGN PATENT DOCUMENTS

| | | |
|---|---|---|
| DE | 29720689 U1 | 2/1998 |
| DE | 10206484 A1 | 11/2003 |
| DE | 10110860 B4 | 4/2006 |
| EP | 1768823 B1 | 3/2014 |
| FR | 2063573 A5 | 7/1971 |
| FR | 2257409 A1 | 8/1975 |
| GB | 1279663 | 6/1972 |
| GB | 1291997 | 10/1972 |
| JP | S62286708 A | 12/1987 |
| JP | S6384904 A | 4/1988 |
| JP | S63291632 A | 11/1988 |
| JP | H03231825 A | 10/1991 |
| JP | 05057725 | 3/1993 |
| JP | H11188764 A | 7/1999 |
| JP | 2010194794 A | 9/2010 |
| JP | 2011224801 A | 11/2011 |
| JP | 2013035234 A | 2/2013 |
| JP | 2014184733 A | 10/2014 |
| JP | 2016043623 A | 4/2016 |
| JP | 2016107509 A | 6/2016 |
| JP | 2016182687 A | 10/2016 |
| JP | 2016215470 A | 12/2016 |
| JP | 2016215473 A | 12/2016 |
| JP | 2016215475 A | 12/2016 |
| NL | 44896 C | 1/1939 |
| NL | 52125 C | 3/1942 |
| WO | 8606325 | 2/1985 |

OTHER PUBLICATIONS

WMV Product Brochure 2017, available online at http://www.wmv.nl/wear_resistant_coating_for_extrusion_and_plast_molding_screw.htm.

Cowell Product Brochure 2017, available online at http://www.nbcowell.com/content/?93.html.

* cited by examiner

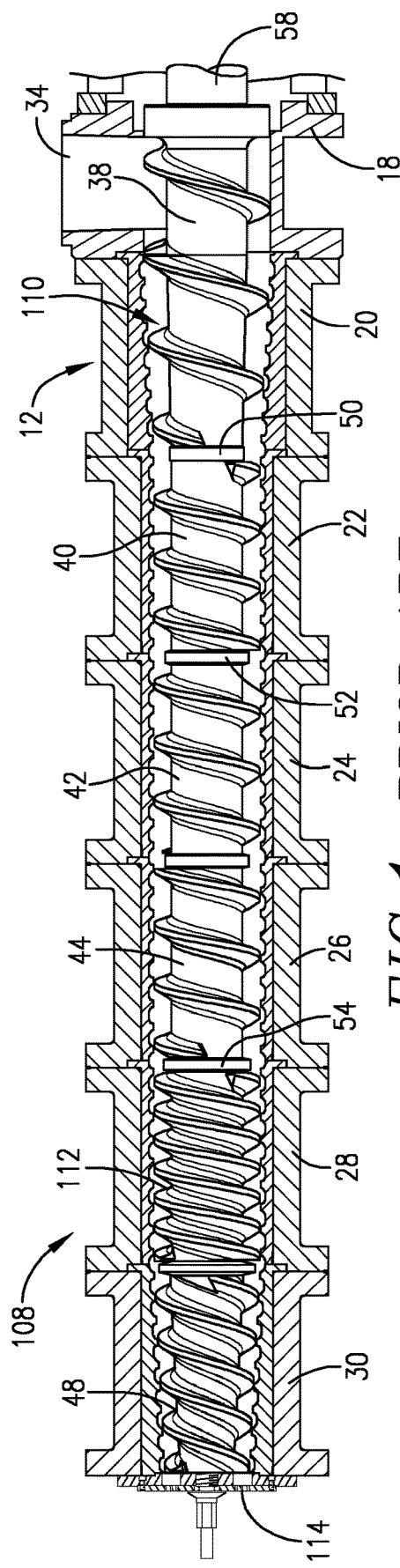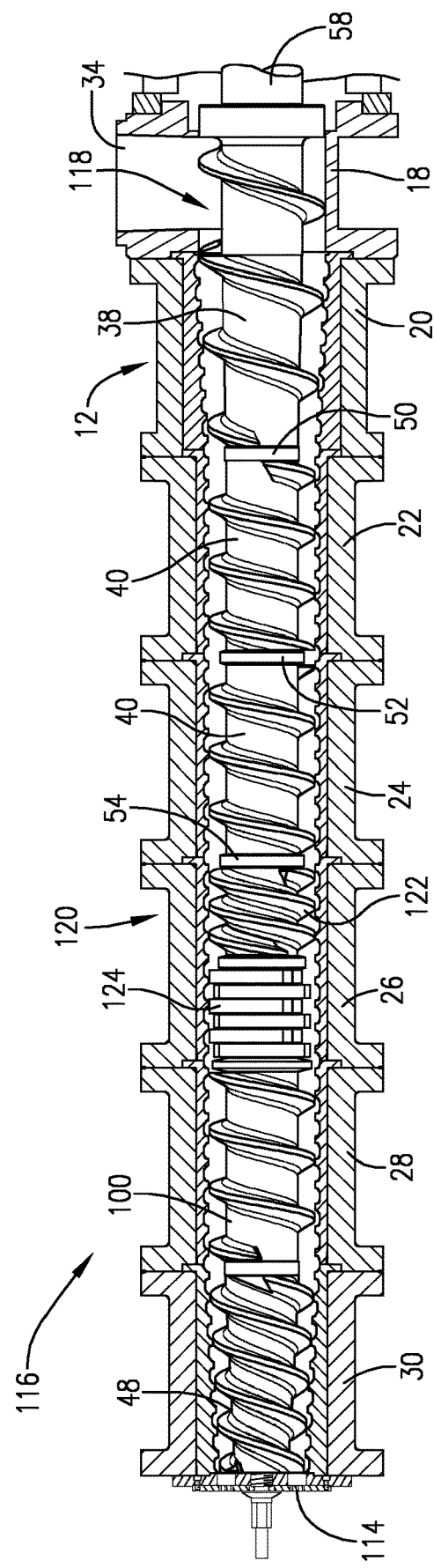

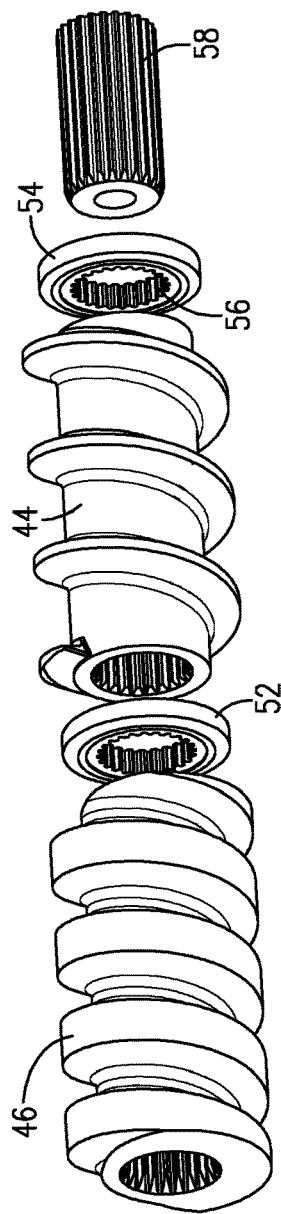
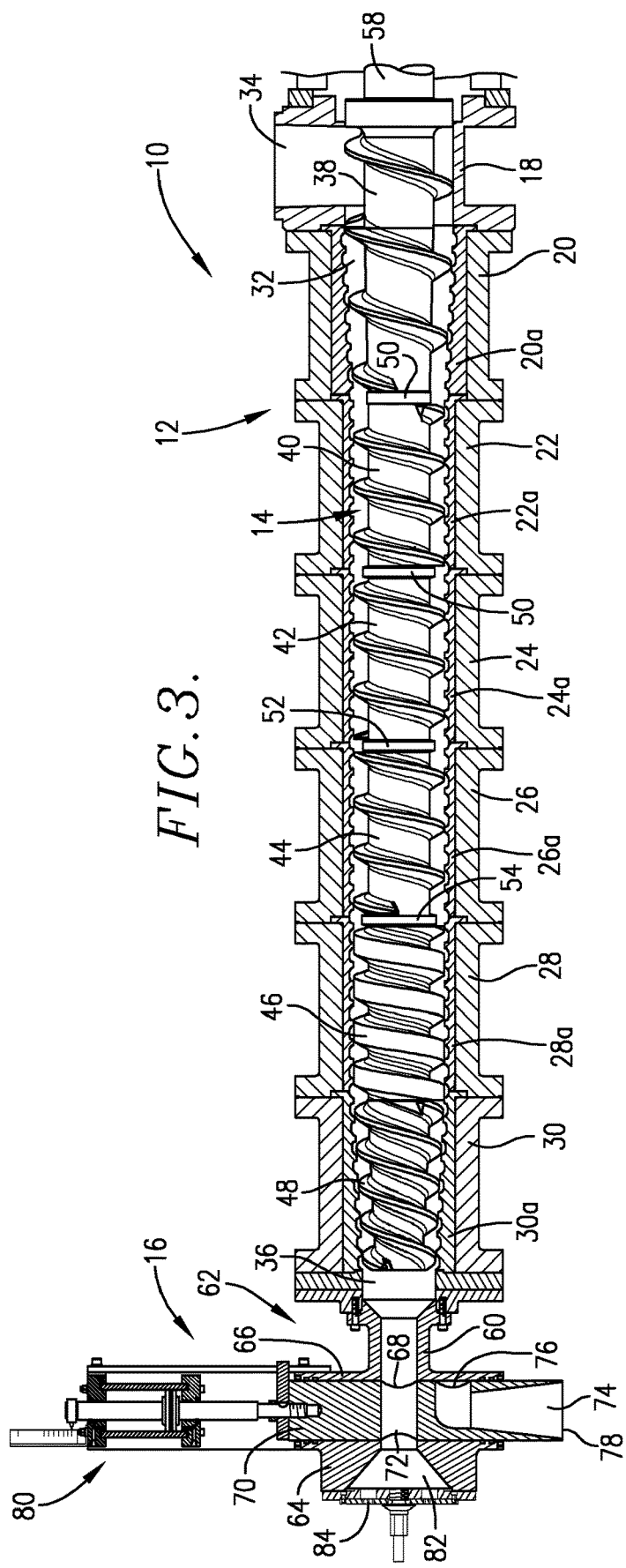

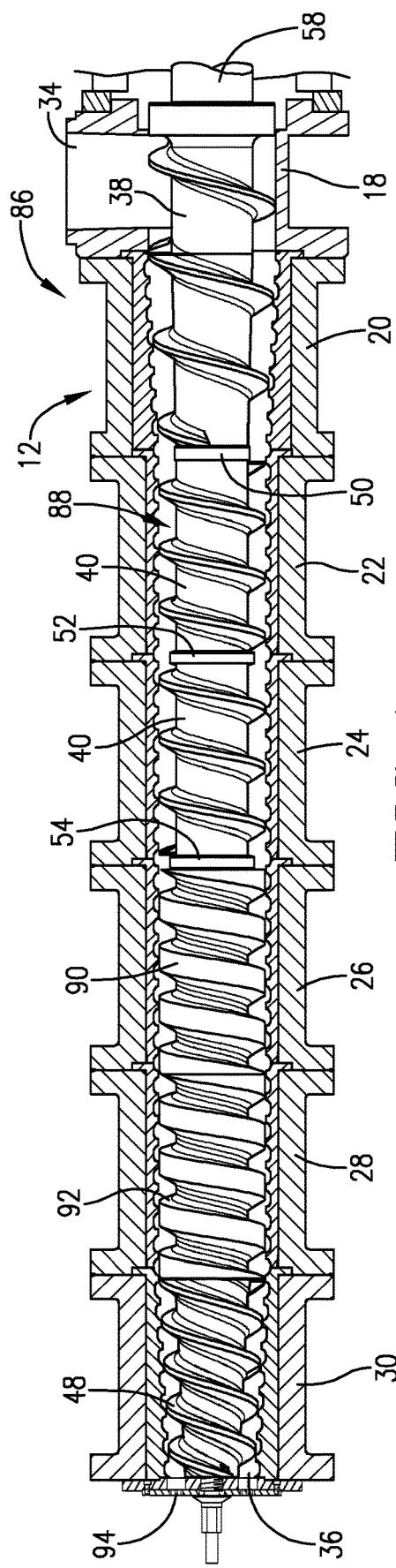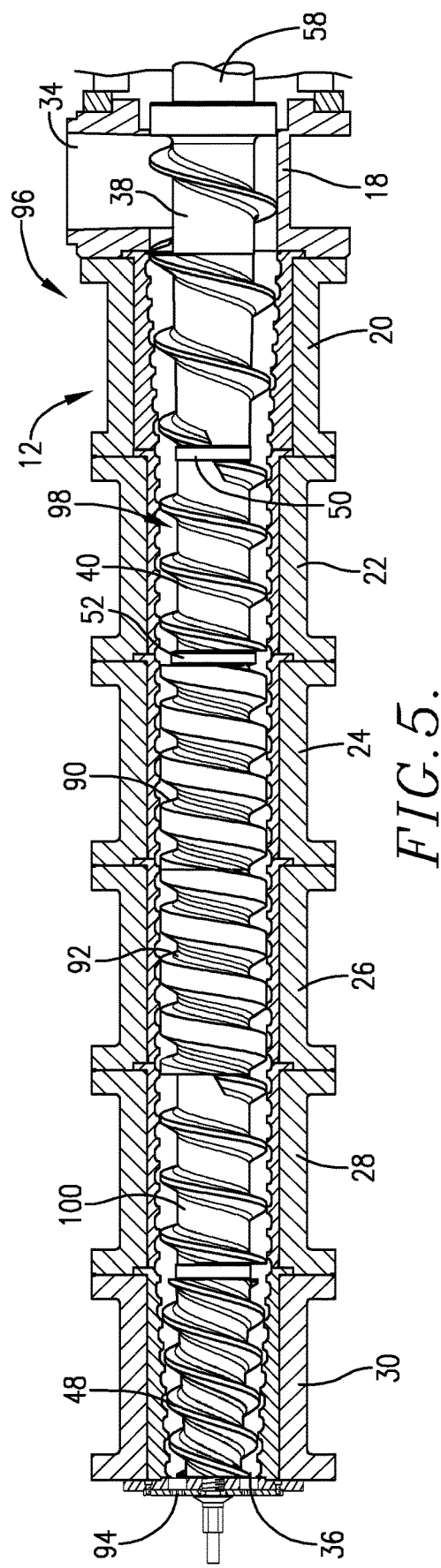

HIGH SPECIFIC MECHANICAL ENERGY EXTRUSION SCREW ASSEMBLY

CROSS-REFERENCE TO RELATED APPLICATION

This application claims the benefit of provisional application Ser. 62/513,899 filed Jun. 1, 2017, which is incorporated herein by reference in its entirety.

BACKGROUND OF THE INVENTION

Field of the Invention

The present invention is broadly concerned with helically flighted extrusion screw assemblies and extruders which are specially designed for processing of comestible food or feed products, such as pet and aquatic feeds. More particularly, the invention is concerned with such equipment, and corresponding methods, wherein the extruder screw assemblies are characterized by intermediate screw sections having relatively wide flight widths, as compared with inlet and outlet screw sections on opposite sides of the intermediate sections. This increases the Specific Mechanical Energy (SME) imparted to the products during processing thereof, which enhances the nutritional and handling qualities of the products.

Description of the Prior Art

Many comestible products such as human foods and animal feeds are produced using extrusion equipment, the general configuration and operation of which is well known in the art. During extrusion, energy is imparted to the materials being processed, by two separate contributions, namely SME and Specific Thermal Energy (STE), the latter being accomplished by indirect or direct application of hot water or steam. The amounts of SME and STE can be varied depending upon the type of product desired and other processing considerations. However, certain types of comestible products, such as aquatic feeds, require enhanced properties, such as increased fat/oil uptake and retention, as well as nutritional and feeding characteristics when high levels of SME are employed. SME is normally developed by frictional forces and associated heat during the extrusion process.

Heretofore, attempts at making high-quality aquatic and other feeds using single screw extruders has required the use of specialized tooling or other expedients in order to generate sufficient amounts of SME. For example, it is known that mid-barrel adjustable valves can be helpful in this regard, of the type described in US Patent Publication 2007/0237850. Additionally, use has been made of non-flighted triangular or other types of plates placed between helical sections of extruder screws, as well as breaker rings, all in an effort to increase SME. However, these attempts have not been wholly satisfactory, meaning that many comestible food or feed products produced using single screw extruders have not been of optimum quality.

The following references describe various types of extruder screw assemblies known in the art: U.S. Pat. Nos. 1,677,119, 2,115,006, 2,231,357, 2,508,495, 2,686,336, 3,104,420, 3,577,494, 3,698,541, 4,277,182, 4,405,239, 4,818,206, 5,728,337, 6,599,004, 6,672,753, 7,476,096, and 8,985,034; US Patent Publication No. 2009/0016147; foreign applications Nos. CN204222133U, DE1504449A1, DE10110860B4, DE10206484A1, DE29720689U1, EP1768823B1; FR2063573A5, FR2257409A1, GB1279663A, GB1291997A, JP2010194794A, JP2011224801A, JP2013035234A, JP2014184733A, JP2016943623A, JP2016107509A, JP2016182687A, JP2016215470A, JP2016215473A, JP2016215475A, JPH03231825A, JPH11188764A, JPS5057725A, JPS6384904A, JPS62286708A, JPS63291632A, NL44896C, NL52125C, and WO8606325A1; and two product brochures.

SUMMARY OF THE INVENTION

The present invention overcomes the problems outlined above, and provides improved extruder screw assemblies and complete extruders, which are characterized by the ability to generate high levels of SME without the need for specialized tooling or other add-on equipment. Generally speaking, the extruder screw assemblies of the invention are designed for placement within an elongated extruder barrel having an inlet and a spaced outlet. The screw assemblies are helically flighted along the lengths thereof, axially rotatable, and have a total length. When placed within an extruder barrel, the screw assemblies comprise:

a helically flighted inlet section having an axial length, a pitch length, and a screw diameter, with the inlet section extending from the barrel inlet toward the barrel outlet and presenting an inlet section terminus;

a helically flighted intermediate section having an axial length, a pitch length, and a screw diameter, with the intermediate section extending from the inlet section terminus toward the barrel outlet and presenting an intermediate section terminus; and a helically flighted outlet section having an axial length, a pitch length, and a screw diameter, with the outlet section extending from the intermediate section terminus toward the barrel outlet.

Additionally, the screw assemblies are characterized by the intermediate sections thereof having a flight width greater than the flight widths of the inlet and outlet sections. Such wide-flight intermediate sections create areas of intense friction and heat generation during processing of comestible materials, thereby increasing the SME imparted to the materials. A number of other dimensional and geometric features can be designed into the screw assemblies, depending upon the desired products to be produced. For example, optional preferred features include intermediate sections with flight widths at least about 250% greater than the flight widths of the inlet and outlet sections; intermediate section flight widths which are from about 20-80% of the pitch length of the intermediate section; and/or intermediate section flight widths which are from about 15-50% of the screw diameters of the intermediate sections. Further, other such features relating to the relative axial lengths of the inlet, intermediate, and outlet screw sections, and the pitch lengths or flight depths of these sections can be incorporated into the overall extruder screw assemblies.

The invention also pertains to methods of operating the extruders of the invention, in the processing of comestible food or feed products having starting mixtures comprising respective quantities of starch, protein, and fat, for example.

While the extruder screw assemblies of the invention are particularly useful in the context of single screw extruders, the invention is not so limited. Rather, these same types of screw assemblies can be incorporated into twin screw extruders, if desired. Moreover, while the individual screw sections described herein are preferably flighted throughout the lengths thereof, this is not strictly necessary. Individual screw sections may have unflighted regions along the lengths thereof, but preferably the sections should have at least about 75% of the lengths bearing fighting, more preferably about 90% of such lengths.

BRIEF DESCRIPTION OF THE DRAWINGS

FIG. 1 is a vertical sectional view illustrating a typical prior art single screw extruder for the production of pet feeds;

FIG. 2 is a vertical sectional view illustrating a typical prior art single screw extruder for the production of aquatic feeds;

FIG. 3 is a vertical sectional view illustrating an extruder in accordance with the present invention having an intermediate wide-flight screw section;

FIG. 4 is a view similar to that of FIG. 3, but illustrating another embodiment of the invention having a different intermediate wide-flight screw section;

FIG. 5 is a view similar to that of FIG. 3, but illustrating another embodiment of the invention having a different intermediate wide-flight screw section;

FIG. 6 is a perspective exploded view illustrating the construction of portions of the FIG. 3 screw assembly;

DETAILED DESCRIPTION OF THE PREFERRED EMBODIMENT

Figure 7:
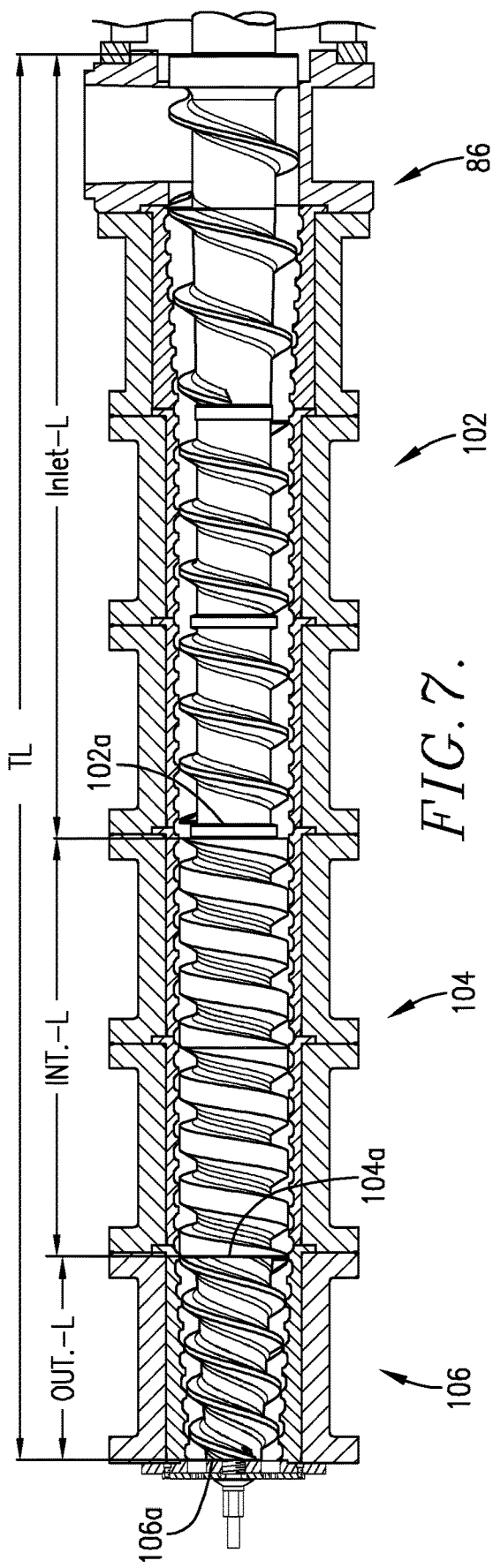
FIG. 7 is a view similar to that of FIG. 5, but including certain important dimensional relationships pertaining to the extruder screw assembly.

Turning first to FIG. 3, an extruder 10 in accordance with the invention is illustrated, broadly made up of a tubular barrel 12, an extruder screw assembly 14 within barrel 12, and a back pressure valve assembly 16 secured to the forward outlet end of the barrel 12. The extruder 10 is designed to process comestible materials, such as edible food or feed products.

In more detail, the barrel 12 includes a total of seven tubular heads 18-30 interconnected in an end-to-end fashion to define an elongated, continuous, substantially circular in cross-section interior 32. As illustrated, inlet head 18 is equipped with a material inlet 34, whereas terminal head 30 presents a processed product outlet 36. Each of the heads 20-30 is equipped with an inner flighted sleeve 20a-30a. The sleeves 20a-28a present substantially tubular passageways, whereas terminal sleeve 30a is tapered along the length thereof. Although not shown, if desired, some or all of the barrel heads may be equipped with external jackets permitting introduction of heat exchange media, such as steam or water; moreover, these heads could also be provided with injectors for allowing direct introduction of steam into the interior 32 of the barrel 12.

The screw assembly 14 is designed to convey material from inlet 34 along the length of barrel 12 and out the outlet 36. Moreover, the screw assembly serves to subject the materials to increasing levels of temperature and shear as material passes through the barrel, in order to cook and form the material. To this end, the assembly 14 is axially rotatable and made up of a series of interconnected, helically flighted sections, namely an inlet section 38, three conventional conveying sections 40, 42, and 44, an intermediate wide-flight section 46, and a conical terminal or outlet section 48. Ring elements 50, 52, and 54 are respectively located between sections 40 and 42, 42 and 44, and 44 and 46.

FIG. 6 illustrates certain components of the screw assembly 14, namely, ring element 52, screw section 44, ring element 54, and wide flight screw section 46. As illustrated, these components, as well as all of those making up the screw assembly 14, are internally splined as at 56, and are adapted to receive a complementally splined drive shaft 58, which extends along the entire length of the drive assembly 14. The drive shaft 58 is in turn connected to a motor/gear reducer assembly (not shown) so as to rotate the screw assembly 14 during operation of extruder 10.

The back pressure valve assembly 16 is of the type described in U.S. Pat. No. 6,773,739, which is incorporated by reference herein in its entirety. In particular, the assembly 16 includes three interconnected components, namely an inlet transition 60, a valve unit 62, and an outlet 64. The transition 60 is secured to the butt end of barrel 12 and is in communication with barrel outlet 36. The valve unit 62 has an upright tubular segment 66 with a lateral opening 68 in alignment with transition 60. An elongated valve member 70 is situated and vertically shiftable within the segment 66. The valve unit 62 includes a somewhat triangular-shaped, laterally extending through-opening 72, as well as a product diversion passageway or channel 74 including an inlet 76 and an outlet 78. The valve unit 62 is selectively movable within segment 66 by means of a piston and cylinder assembly 80.

The outlet 64 has an outwardly diverging passageway 82 in alignment with the opening 68, and is equipped with a restricted orifice die plate 84, as shown.

FIG. 4 illustrates another extruder 86 in accordance with the invention having the same barrel 12, but a modified screw assembly 88. In this instance, the screw assembly 88 differs from screw assembly 14 in that the intermediate wide flight section of the assembly 88 is made up of two interconnected wide flight screw sections 90 and 92 located within heads 26 and 28, in lieu of the single wide flight section 46 of screw assembly 14. Stated otherwise, the conveying screw section 44 of screw assembly 14 has been replaced by the wide flight screw section 90 of assembly 88, whereas the wide flight screw section 92 is identical with the previously described section 46. It will also be observed that a conventional restricted orifice die plate 94 is directly secured to the outlet end of barrel 12, such that the extruder 86 does not include the back pressure valve assembly 16 of the FIG. 3 embodiment.

FIG. 5 depicts a still further extruder 96 having the previously described barrel 12 and a further modified screw assembly 98. In this instance, the screw assembly 98 has the same wide flight sections 90 and 92 of the FIG. 4 embodiment, but these are placed differently than in FIG. 4. Specifically, the wide fight screw sections 90, 92 are located within the heads 24, 26, and a conveying screw section 100 is located within head 28.

It will be appreciated from the foregoing description that the screw assemblies 14, 88, and 98 differ primarily in the length and position of the intermediate wide flight screw section(s) therein. In order to better understand these relationships, FIG. 7 is provided, which is structurally identical with FIG. 4, but has applied thereto certain identifying information. Thus, the total length (TL) of the extruder 86 is depicted, along with an inlet section 102 having a terminus 102a, an intermediate section 104 having a terminus 104a, and an outlet section 106 having a terminus 106a. The length of the inlet screw section (Inlet-L) is also illustrated, together with the length of the intermediate wide flight screw section (INT.-L), and the outlet screw section (OUT.-L). These same length relationships can also be applied to the embodiments of FIGS. 3 and 5. In FIG. 3, the Inlet-L is made up of screw sections 38-44, the INT.-L is made up of screw section 46, and the OUT.-L is made up of screw section 48. Similarly, in FIG. 4, the Inlet-L is made up of screw sections 38-40, the INT.-L is made up of screw sections 90, 92, and the OUT.-L is made up of screw section 48. Finally, the Inlet-L is made up of screw sections 38 and 40, the INT.-L is made up of wide flight screw sections 90 and 92, and OUT.-L is made up of screw sections 100 and 48.

Figure 8:
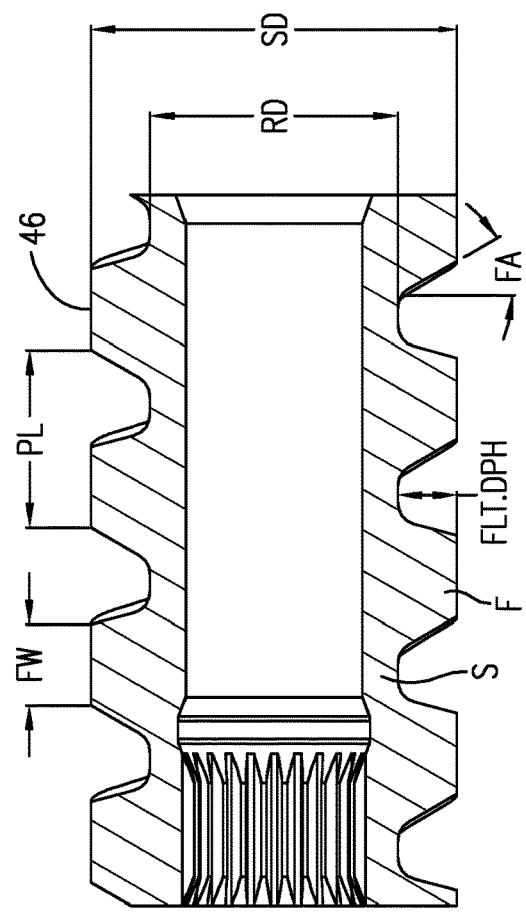
FIG. 8 is a vertical sectional view of a wide-flight screw section in accordance with the invention, illustrating features of the screw and definitions of terms relating to screw geometries.

In the ensuing discussion relating to the geometries of the screw sections making up the screw assemblies 14, 88, and 98, reference will be made to certain features of the individual screw sections, each of which include a central shaft S and outwardly extending, helical fighting F. In order to better understand this discussion, reference is made to FIG. 8, which illustrates a wide flight screw section 46. As shown therein, the screw diameter (SD) is the maximum width of the screw fighting F, whereas the root diameter (RD) is the diameter of the bottom of the shaft S. Therefore, the flight depth (FLT.DPH.) is the difference between the screw diameter (SD) and the root diameter (RD). Further as illustrated in FIG. 8, the pitch length (PL) of the screw section is the axial distance between convolutions of the flighting F, and the flight angle (FA) is the leading angle of the flighting against the direction of material flow through the screw assemblies. Finally, the flight width (FW) is the axial length of the fighting F at the outer extent thereof. While these relationships have been depicted in the context of wide flight section 48, it will be appreciated that these same relationships apply equally to all of the other helically flighted sections of the described screw assemblies.

Preferred Features of the Screw Assemblies 14, 88, 98

The screw assemblies 14, 88, and 98 are all characterized by helically flighted inlet, intermediate, and outlet sections 102-106 each having respective axial lengths (Inlet-Ls, INT.-Ls, and OUT.-Ls), pitch lengths (PLs), screw diameters (SDs), root diameters (RDs), flight widths (FWs), and flight depths (FLT.DPH.s). Each inlet sections 102 extends from the barrel inlet 34 toward the barrel outlets 36 and defines the terminus 102a. Each intermediate section 104 extends from the terminus 102a toward the barrel outlet 36 and defines the intermediate section terminus 104a. Finally, each outlet section 106 extends from the intermediate section terminus 104a toward the barrel outlet 36.

In all of the embodiments, the flight widths of the inlet sections 102 and the outlet sections 106 are less than the flight widths of the intermediate sections 104. However, in different embodiments, the respective sections 102-106 have certain characteristics, as set forth below.

Intermediate Sections 104

The flight widths of the intermediate sections 104 are at least about 250% greater than the flight widths of the inlet sections 102 and the outlet sections 106, e.g., from about 250-750% greater, more preferably from about 300-600% greater, and most preferably from about 325-525% greater.

The flight widths of the intermediate sections 104 are from about 20-80%, more preferably from about 25-55%, of the pitch lengths of the corresponding intermediate sections 104.

The flight widths of the intermediate sections 104 are from about 15-50%, more preferably from about 20-40%, of the screw diameters of the corresponding intermediate sections 104.

The flight angles of the sections 102-106 are from about 20-50°, and more preferably from about 25-35°.

The axial lengths of the intermediate sections 104 are from about 10-40%, more preferably from about 12-35%, of the total lengths of the corresponding screw assemblies 14, 88, 98.

The axial lengths of the intermediate sections 104 are less than the axial lengths of the inlet sections 102 of the corresponding screw assemblies 14, 88, 98, more preferably from about 15-80%, still more preferably from about 18-75%, of the axial lengths of the inlet sections 102 of the corresponding screw assemblies 14, 88, 98.

The pitch lengths of the intermediate sections 104 are from about 30-70%, more preferably from about 40-60%, of the screw diameters of the corresponding intermediate sections 104.

The pitch lengths of the intermediate sections 104 are less than the pitch lengths of the inlet sections of the corresponding screw assemblies 14, 88, 98.

The flight depths of the intermediate sections 104 are from about 8-25%, more preferably from about 12-20%, of the screw diameters of the corresponding intermediate sections 104.

The flight depths of the intermediate sections 104 are less than the flight depths of the inlet sections 102 of the corresponding screw assemblies 14, 88, 98.

The intermediate sections 104 have substantially constant flight depths, i.e., no more than about a 15% variance in such flight depths.

The intermediate sections 104 have substantially constant pitch lengths, i.e., no more than about a 15% variance in such pitch lengths.

The intermediate sections 104 have substantially constant screw diameters, i.e., no more than about a 15% variance in such screw diameters.

The intermediate sections 104 have only a single flight.

Inlet Sections 102

The inlet sections 102 have flight widths of from about 2-15%, more preferably from about 3-12%, of the corresponding pitch lengths of the inlet sections 102.

The inlet sections 102 have flight widths from about 0.4-7%, more preferably from about 0.5-5%, of the axial lengths of the corresponding inlet sections 102.

The inlet sections 102 have flight widths of from about 4-9%, more preferably from about 5-7% of the screw diameters of the corresponding inlet sections 102.

The inlet sections 102 have substantially constant flight depths, i.e., no more than about a 15% variance in such flight depths.

The inlet sections 102 have decreasing pitch lengths along the lengths thereof.

The inlet sections 102 have substantially constant screw diameters, i.e., no more than about a 15% variance in such screw diameters.

The inlet sections 102 have only a single flight.

Outlet Sections 106

The outlet sections 106 have flight widths of from about 4-15%, more preferably from about 5-12%, of the corresponding pitch lengths of the outlet sections 106.

The outlet sections 106 have flight widths from about 0.4-10%, more preferably from about 1-7.5%, of the axial lengths of the corresponding outlet sections 106.

The outlet sections 106 have flight widths of from about 2-8%, more preferably from about 3-7% of the screw diameters of the corresponding outlet sections 106.

The outlet sections 106 have substantially constant flight depths, i.e., no more than about a 15% variance in such flight depths.

The outlet sections 106 have substantially constant or decreasing pitch lengths along the lengths thereof.

The outlet sections 106 have portions thereof with decreasing screw diameters.

The outlet sections 106 are double flighted when a conical terminal segment is employed, but otherwise have only a single flight.

It should be understood that not all of the above-described preferred features for the intermediate, inlet, and outlet sections need be present in every such section; rather, any given intermediate, inlet, or outlet section may embody one or more of the respective preferred features. Additionally, while in some cases the screw assembly sections preferably have essentially constant screw diameters, root diameters, and flight depths, the invention is not so limited. In instances where the screw diameters, root diameters, and/or flight depths vary along the lengths of the sections, for purposes of the percentage ranges given above, the screw diameters, root diameters, or flight depths, as the case may be, should be determined as the arithmetic mean of the greatest and smallest values. For example, if a given section has a decreasing screw diameter, the maximum screw diameter is added to the minimum screw diameter, and this sum is divided by 2. This same analysis would follow for the root diameters and flight depths.

Operation

As noted previously, the extruders of the invention are designed for the production of comestible food or feed products, and are not suitable for processing of rubber and plastic materials. During operations where comestible products are prepared, starting dry mixtures, are formulated typically containing grain(s) (e.g., wheat, corn, oats, milo, soy), proteins, fats, vitamins, minerals, and the like. These mixtures are normally preconditioned by passage through known preconditioner apparatus, such as Wenger DDC or HIP preconditions, in order to moisturize and precook the mixtures. The preconditioned mixtures are then fed into the inlet of the extruder during rotation the screw assemblies therein, in order to move the materials along the length of the extruder barrels for ultimate extrusion. During such passage, the materials are subjected to increasing levels of temperature, pressure, and shear in order to fully cook the materials and allow formation thereof as self-sustaining bodies. The extruded products are then normally dried and may be coated with oil or other liquids to create the final products.

Where use is made of a backpressure valve assembly 16, the valve member 70 is normally placed in its upper position during startup of the extruder so that material from the barrel 12 will pass through the inlet 76 and out through passageway 74. As the extruder run progresses and acceptable extrudates are being produced, the valve member is shifted downwardly to the FIG. 3 position, where the through-opening 72 is in registry with the transition 60 and passageway 82. During processing, it may be necessary to adjust the backpressure exerted by the assembly 16, which involves up or down adjustment of the valve member 70 to change the effective area presented by through-opening 82. Of course, all such movements of the valve member 70 are accomplished by actuation of piston and cylinder assembly 80.

In the context of the present invention, the materials are subjected to high levels of friction and shear in the intermediate wide-flight sections 104 of the extruders. Consequently, the products are formed with relatively high levels of SME, which enhances the physical and nutritional properties of the products. The presence of the sections 104 thus permits production of high-quality end products without the use of extraneous tools or equipment characteristic of prior art extruders of this type.

Prior Art Screw Assemblies

As indicated above, the present invention provides improved screw assemblies and extruders, which are capable of producing high-quality feeds, such as pet feeds and aquatic feeds, without the use of expedients such as mid-barrel valves, specialized mixing plates, and multiple die plate arrangements. In order to better understand the nature of the present invention as it relates to the prior art, attention is first directed to FIG. 1, which illustrates a typical single-screw extruder designed for the production of pet feeds. The extruder 108 is in many respects similar to that of extruder 10 of FIG. 3, having the same barrel 12, and a screw assembly 110 having the screw sections 38-44 and 48 of screw assembly 14. The extruder 108 has an intermediate screw section 112 having a conventional flight width, as compared with the screw section 46 of FIG. 3, as well as a restricted orifice die plate 114 without the use of backpressure valve assembly 16.

Similarly, FIG. 2 depicts a prior art extruder 116 having a barrel 12 and a screw assembly 118. The latter has the screw sections 38-42 of FIG. 3, and the screw sections 100, 48 of FIG. 5. However, the extruder 116 has an intermediate section 120 in the form of a short flighted element 122 followed by a series of mixing plates 124. Again, it is to be noted that the flight width of the element 122 is of conventional, narrow design.

EXAMPLES

The following examples set forth preferred extruder configurations and test results using these configurations. It is to be understood, however, that these examples are provided by way of illustration only, and nothing therein should be taken as a limitation on the overall scope of the invention.

A series of comparative extruder runs for the preparation of salmon feed were carried out using two different extruder configurations, namely a standard extruder configuration as illustrated in FIG. 2 (Std.), and the wide-flight configuration illustrated in FIG. 4 (W-F). Each extruder was equipped with a back pressure valve, as illustrated in FIG. 3. In each instance, a Wenger HIP preconditioner was used to precondition the materials prior to passage into the extruders. The preconditioning was carried out identically in each run. In each test, the dry feed rate of material to the extruders was 3000 kg/hr. As the feed products exited the extruders, they were coated with oil prior to drying, and were then dried to a moisture content of about 8-9% by weight.

In each case, the salmon feed recipe was made up of 25.4% ground wheat, 30.5% soy concentrate (60%), 13.1% Menhaden fish meal, 13.2% corn gluten meal (60%), and 17.8% wheat gluten, where all percentages are by weight.

The following table sets forth the conditions used in the comparative tests, as well as the properties of the extrudates, where moisture % refers to the moisture of the products off of the extruder prior to any drying, and oil absorption is the retained oil absorption for the products after 18 hours soaking in water, followed by vacuum drying.

TABLE

| Run No. | Setup | Screw Speed (rpm) | SME (kwhr/t) | Motor Load (%) | Wet Density (g/L) | Dry Density (g/L) | Cook (%) | Moisture (%) | Oil Absorption (%) |
|---|---|---|---|---|---|---|---|---|---|
| 1 | Std. | 400 | 21 | 60 | 580 | 524 | 93.4 | 25.4 | 25.1 |
| 3 | W-F | 400 | 21 | 57 | 450 | 436 | 93.1 | 24.1 | 29.9 |
| 2 | Std. | 450 | 31 | 76 | 420 | 406 | 93.9 | 23.4 | 38.0 |
| 4 | W-F | 450 | 33 | 81 | 425 | 372 | 97.6 | 22.8 | 39.7 |

These test results confirm that the W-F extruder configuration gave the same or slightly higher cook levels, lower wet and dry bulk densities, and higher oil absorption values, as compared with the Std. configuration. The latter result is particularly important because salmon feeds produced using Std. configuration extruders tend to lose oil. The physical appearance of the feeds prepared using the W-F configuration were superior to those from the Std. configuration.

We claim:

1. An extruder screw assembly designed for placement within an elongated extruder barrel having an inlet and a spaced outlet, said screw assembly being helically flighted, axially rotatable, having a total length, said assembly comprising:
    a) a helically flighted inlet section having an axial length, a pitch length, and a screw diameter, said inlet section extending from said barrel inlet toward said barrel outlet and presenting an inlet section terminus,
    b) a helically flighted intermediate section having an axial length, a pitch length, and a screw diameter, said intermediate section extending from said inlet section terminus toward said barrel outlet and presenting an intermediate section terminus, and
    c) a helically flighted outlet section having an axial length, a pitch length, and a screw diameter, said outlet section extending from said intermediate section terminus toward said barrel outlet,
    d) said axial length of said intermediate section being less than the axial length of said inlet section,
    e) said intermediate section having a flight width which is from about 20-80% of the pitch length of the intermediate section,
    f) the flight widths of said inlet section and said outlet section being less than the flight width of said intermediate section,
    g) the pitch length of said intermediate section being less than the pitch length of said inlet section,
    said conditions a)-g), inclusive, being present when said assembly is placed within an extruder barrel with said inlet section adjacent said barrel inlet and said outlet section adjacent said barrel outlet.

2. An extruder comprising an elongated barrel having an inlet and an outlet, and an elongated, helically flighted axially rotatable screw assembly within said barrel having a total length, said screw assembly being in accordance with claim 1.

3. An extruder screw assembly designed for placement within an elongated extruder barrel having an inlet and a spaced outlet, said screw assembly being helically flighted, axially rotatable, having a total length, said assembly comprising:
    a) a helically flighted inlet section having an axial length, a pitch length, and a screw diameter, said inlet section extending from said barrel inlet toward said barrel outlet and presenting an inlet section terminus,
    b) a helically flighted intermediate section having an axial length, a pitch length, and a screw diameter, said intermediate section extending from said inlet section terminus toward said barrel outlet and presenting an intermediate section terminus, and
    c) a helically flighted outlet section having an axial length, a pitch length, and a screw diameter, said outlet section extending from said intermediate section terminus toward said barrel outlet,
    d) said axial length of said intermediate section being less than the axial length of said inlet section,
    e) said intermediate section having a flight width which is from about 15-50% of the screw diameter thereof,
    f) the flight widths of said inlet section and said outlet section being less than the flight width of said intermediate section,
    g) the pitch length of said intermediate section being less than the pitch length of said inlet section,
    said conditions a)-g), inclusive, being present when said assembly is placed within an extruder barrel with said inlet section adjacent said barrel inlet and said outlet section adjacent said barrel outlet.

4. An extruder comprising an elongated barrel having an inlet and an outlet, and an elongated, helically flighted axially rotatable screw assembly within said barrel having a total length, said screw assembly being in accordance with claim 3.

5. An extruder screw assembly designed for placement within an elongated extruder barrel having an inlet and a spaced outlet, said screw assembly being helically flighted, axially rotatable, having a total length, said assembly comprising:
    a) a helically flighted inlet section having an axial length, a pitch length, and a screw diameter, said inlet section extending from said barrel inlet toward said barrel outlet and presenting an inlet section terminus,
    b) a helically flighted intermediate section having an axial length, a pitch length, and a screw diameter, said intermediate section extending from said inlet section terminus toward said barrel outlet and presenting an intermediate section terminus, and
    c) a helically flighted outlet section having an axial length, a pitch length, and a screw diameter, said outlet section extending from said intermediate section terminus toward said barrel outlet,
    d) said axial length of said intermediate section being less than the axial length of said inlet section,
    e) the flight width of said intermediate section being at least about 250% greater than the flight widths of said inlet and outlet sections,
    f) the pitch length of said intermediate section being less than the pitch length of said inlet section,
    said conditions a)-f), inclusive, being present when said assembly is placed within an extruder barrel with said inlet section adjacent said barrel inlet and said outlet section adjacent said barrel outlet.

6. An extruder comprising an elongated barrel having an inlet and an outlet, and an elongated, helically flighted axially rotatable screw assembly within said barrel having a total length, said screw assembly being in accordance with claim 5.

7. An extruder screw assembly designed for placement within an elongated extruder barrel having an inlet and a spaced outlet, said screw assembly being helically flighted, axially rotatable, having a total length, said assembly comprising:
 a) a helically flighted inlet section having an axial length, a pitch length, and a screw diameter, said inlet section extending from said barrel inlet toward said barrel outlet and presenting an inlet section terminus,
 b) a helically flighted intermediate section having an axial length, a pitch length, and a screw diameter, said intermediate section extending from said inlet section terminus toward said barrel outlet and presenting an intermediate section terminus, and
 c) a helically flighted outlet section having an axial length, a pitch length, and a screw diameter, said outlet section extending from said intermediate section terminus toward said barrel outlet,
 d) the flight widths of said inlet section and said outlet section being less than the flight width of said intermediate section,
 e) said axial length of said intermediate section being less than the axial length of said inlet section,
 f) the pitch length of said intermediate section being less than the pitch length of said inlet section,
 said conditions a)-f), inclusive, being present when said assembly is placed within an extruder barrel with said inlet section adjacent said barrel inlet and said outlet section adjacent said barrel outlet.

8. The screw assembly of claim 7, said intermediate section axial length being from about 10-40% of the total length of the screw assembly.

9. The screw assembly of claim 7, the flight width of said intermediate section being from about 15-50% of the screw diameter thereof.

10. The screw assembly of claim 7, the axial length of said intermediate section being from about 15-80% of the axial length of said inlet section.

11. The screw assembly of claim 7, said inlet and outlet section flight widths each being from about 2-15% of the corresponding pitch length of the inlet and outlet sections, respectively.

12. The screw assembly of claim 7, said inlet and outlet section flight widths each being from about 0.4-7% of the corresponding axial length of the inlet and outlet sections, respectively.

13. The screw assembly of claim 7, the flight width of said inlet and outlet sections each being from about 2-8% of the corresponding screw diameter of the inlet and outlet sections, respectively.

14. The screw assembly of claim 7, the flight depth of said intermediate section being from about 8-25% of the screw diameter thereof.

15. The screw assembly of claim 7, said intermediate section having a constant screw diameter along the length thereof.

16. The screw assembly of claim 7, said intermediate section having only a single flight.

17. The screw assembly of claim 7, said intermediate section having a pitch length of from about 30-70% of the screw diameter of the intermediate section.

18. The screw assembly of claim 7, the screw diameter of said outlet section being tapered along the length thereof.

19. The screw assembly of claim 7, the pitch length of said intermediate section being less than the pitch length of said inlet section.

20. The screw assembly of claim 7, the flight depth of said intermediate section being less than the flight depth of said inlet section.

21. The screw assembly of claim 7, said intermediate section having a flight width which is from about 20-80% of the pitch length of the intermediate section.

22. The screw assembly of claim 7, the flight width of said intermediate section being at least about 250% greater than the flight widths of said inlet and outlet sections.

23. The screw assembly of claim 7, said intermediate flight section having a flight width which is from about 15-50% of the screw diameter thereof.

24. The screw assembly of claim 7, said intermediate section having a substantially constant flight depth and a substantially constant pitch length along the length thereof.

25. The screw assembly of claim 7, said intermediate section presenting only a single helical passageway between the helical convolutions thereof.

* * * * *